United States Patent
Li et al.

(10) Patent No.: US 11,300,193 B2
(45) Date of Patent: Apr. 12, 2022

(54) INTEGRATED ELECTRIC DRIVE POWER ASSEMBLY

(71) Applicant: Jing-Jin Electric Technologies Co., Ltd., Beijing (CN)

(72) Inventors: Jianwen Li, Beijing (CN); Yongwu Wang, Beijing (CN); Ping Yu, Beijing (CN); Ran Sun, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 271 days.

(21) Appl. No.: 16/494,525

(22) PCT Filed: Jun. 11, 2019

(86) PCT No.: PCT/CN2019/090711
§ 371 (c)(1),
(2) Date: Sep. 16, 2019

(87) PCT Pub. No.: WO2019/238042
PCT Pub. Date: Dec. 19, 2019

(65) Prior Publication Data
US 2021/0332877 A1    Oct. 28, 2021

(30) Foreign Application Priority Data

Jun. 12, 2018  (CN) .......................... 201810601801.1

(51) Int. Cl.
*F16H 57/021* (2012.01)
*B60K 17/12* (2006.01)
(Continued)

(52) U.S. Cl.
CPC ........... *F16H 57/021* (2013.01); *B60K 17/12* (2013.01); *F16H 57/023* (2013.01);
(Continued)

(58) Field of Classification Search
CPC .... F16H 57/021; F16H 57/023; F16H 57/029; F16H 57/031; F16H 63/3425;
(Continued)

(56) References Cited

U.S. PATENT DOCUMENTS 5,718,302 A     2/1998  Hasebe et al.
5,832,789 A  *  11/1998  Kinto ..................... H02K 7/116
                                                  74/606 R

FOREIGN PATENT DOCUMENTS

CN        201881891 U      6/2011
CN        201881893 U      6/2011
(Continued)

OTHER PUBLICATIONS

Communication pursuant to Article 94(3) EPC issued in EP 19765630.9 dated Jul. 6, 2020.
(Continued)

*Primary Examiner* — Thomas C Diaz
(74) *Attorney, Agent, or Firm* — Fox Rothschild LLP; Carol E. Thorstad-Forsyth

(57) ABSTRACT

The present disclosure discloses an integrated electric drive power assembly, which solves the problems of the electrically driving power assemblies in the prior art that have a greater axial size and greater weight. The power assembly comprises a motor and a gearbox, an output shaft of the motor and an input shaft of the gearbox are integrally manufactured, to form a main shaft of the power assembly, a parking lock wheel is provided within the gearbox, and the parking lock wheel is fixedly mounted to the main shaft. The present disclosure significantly reduces the axial size of the power assembly, which facilitates the light weighing and the arrangement in the vehicle of the power assembly.

5 Claims, 1 Drawing Sheet

(51) Int. Cl.
*F16H 57/023* (2012.01)
*F16H 57/029* (2012.01)
*F16H 57/031* (2012.01)
*F16H 63/34* (2006.01)
*F16H 57/02* (2012.01)

(52) U.S. Cl.
CPC ......... *F16H 57/029* (2013.01); *F16H 57/031* (2013.01); *F16H 63/3425* (2013.01); *F16H 63/3466* (2013.01); *F16H 2057/02034* (2013.01); *F16H 2200/0021* (2013.01); *F16H 2200/0043* (2013.01)

(58) Field of Classification Search
CPC ....... F16H 63/3466; F16H 2057/02034; F16H 2200/0043
See application file for complete search history.

(56) References Cited

FOREIGN PATENT DOCUMENTS

| | | | |
|---|---|---|---|
| CN | 103795183 A | 5/2014 | |
| CN | 104377881 A | 2/2015 | |
| CN | 204271815 U | 4/2015 | |
| CN | 105757210 A | * 7/2016 | ............... H02K 5/20 |
| CN | 108674179 A | 10/2018 | |
| CN | 208428960 U | 1/2019 | |
| DE | 102007055767 A1 | 6/2009 | |
| DE | 102007055768 A1 | 6/2009 | |
| DE | 102011080236 A1 | 2/2013 | |
| EP | 2263899 A2 | 12/2010 | |
| JP | H02102053 U | 8/1990 | |
| JP | H09226394 A | 9/1997 | |
| JP | 57-11363 B2 | 4/2015 | |
| JP | 2017061994 A | 3/2017 | |
| JP | 2018062314 A | 4/2018 | |
| WO | 2011007602 A1 | 1/2011 | |

OTHER PUBLICATIONS

European Search Report issued in EP 19765630.9 dated Mar. 4, 2020.
Opposition filed in JP2021-700943 dated Sep. 29, 2021.
Anlagenkonvolut, fruhester Offenlegungstag: Mar. 3, 2016, spatester Offenlegungstag: Aug. 2017.
Notice of Opposition dated Dec. 23, 2021 in EP 19765630.9.

* cited by examiner

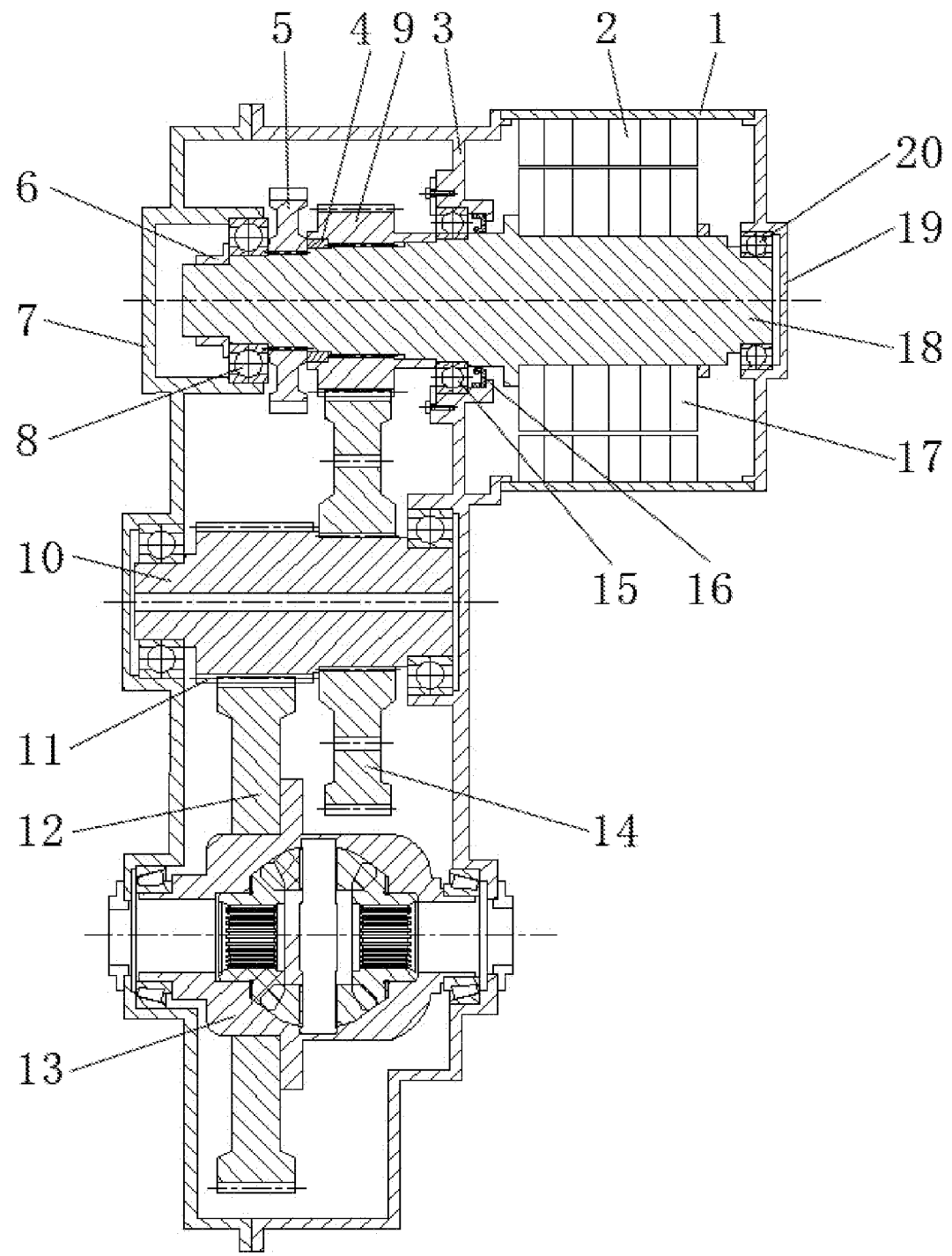

INTEGRATED ELECTRIC DRIVE POWER ASSEMBLY

CROSS-REFERENCE TO RELATED APPLICATIONS

The present application is the U.S. National Phase Entry of International Patent Application No. PCT/CN2019/090711, filed on Jun. 11, 2019 and entitled "INTEGRATED ELECTRIC DRIVE POWER ASSEMBLY," which claims priority to Chinese Patent Application No. CN 201810601801.1, filed on Jun. 12, 2018, the contents of which are incorporated herein by reference in their entireties.

TECHNICAL FIELD

The present disclosure relates to an integrated electric drive power assembly, connected to a vehicle axle, for driving the vehicle.

BACKGROUND

All of the current purely electrically driven or hybrid-power new-energy vehicles are provided with an electric drive power assembly. The electric drive power assembly comprises a motor and a gearbox, and the output shaft (or rotation shaft) of the motor and the input shaft of the gearbox are connected to transmit the torque.

The output shaft (or rotation shaft) of the motor and the input shaft of the gearbox are generally linked by a shaft coupling, which has many parts, a complicated structure, a low accuracy and a high noise, and increases the axial size of the gearbox and the motor, which is adverse to the light weighing and the arrangement in the vehicle of the electric drive power assembly.

In conventional gearboxes, some are provided with a parking lock wheel to brake when the vehicle stops to prevent car sliding (P gear), and the parking lock wheel, when being locked, can prevent the transmission part to rotate. The parking lock wheel is generally arranged at the middle shaft or the output differential, and when it is arranged at the two positions, the lay-up torque of the parking lock wheel is larger, and therefore the axial size of the parking lock wheel is required to be designed to be larger, which increases the axial size of the gearbox.

SUMMARY

Aiming at the above problems of the prior art, the present disclosure provides an integrated electric drive power assembly, which can reduce the axial size of the power assembly.

To achieve the above object, the technical solutions of the present disclosure are realized as follows:

The present disclosure provides an integrated electric drive power assembly, wherein the integrated electric drive power assembly comprises an motor and a gearbox, an output shaft of the motor and an input shaft of the gearbox are integrally manufactured, to form a main shaft of the power assembly, a parking lock wheel is provided within the gearbox, and the parking lock wheel is fixedly mounted to the main shaft.

Optionally, a motor rear end cover and a gearbox front housing are integrally manufactured, a shaft mounting bore is provided at gearbox front housing, and the main shaft passes through the shaft mounting bore to enter the gearbox.

Optionally, an middle bearing and an oil seal are mounted at the shaft mounting bore, the middle bearing supports the main shaft, and the oil seal seals a gap between the main shaft and the shaft mounting bore, to seal and isolate the gearbox and the motor.

Optionally, a left end bearing and a right end bearing are provided at two ends of the main shaft respectively, the left end bearing is fixedly mounted to a gearbox rear housing, a bearing seat is correspondingly provided at the gearbox rear housing, the right end bearing is fixedly mounted to a motor front end cover, and a bearing seat is correspondingly provided at the front end cover.

Optionally, multi-stage gear pairs are provided in the gearbox, a rightmost first-stage gear pair is connected to the main shaft and is neighboring the motor, and the parking lock wheel is located on a left side of the first gear pair.

Optionally, an middle shaft is provided in the gearbox, the first gear pair comprises a first gear and a second gear that are in engaged transmission, the first gear is connected to the main shaft by a spline, the second gear is connected to the middle shaft by a spline, a right end face of a hub of the first gear presses an inner ring of the middle bearing, and a bushing is provided in a bore of a left end to be in interference fit with the main shaft to fix the first gear.

Optionally, the parking lock wheel is connected to the main shaft by a spline, the right end face of the hub of the parking lock wheel presses the bushing, and a left end face is pressed by an inner ring of the left end bearing.

Optionally, a lock nut is provided at a left end of the main shaft to press the inner ring of the left end bearing.

Optionally, two stages of transmission gear pairs are provided in the gearbox, a rightmost first-stage gear pair is adjacent to the motor, a second-stage gear pair is located on a left side of the first gear pair, the second-stage gear pair comprises a third gear and a fourth gear that are in engaged transmission, the third gear and the middle shaft are integrally manufactured, the fourth gear is fixedly mounted to a differential, and the differential is connected to a vehicle axle.

Optionally, two ends of the middle shaft are each provided with a bearing, and gearbox front housing and the gearbox rear housing are each correspondingly provided with a bearing seat.

Optionally, gearbox front housing is provided with a bearing seat and a sealing groove at the shaft mounting bore, the sealing groove is located on a right side of the bearing seat, the middle bearing is mounted in the bearing seat, the oil seal is mounted in the sealing groove, a first step is provided between the bearing seat and the sealing groove, the first step limits a right side of the middle bearing, a second step is provided at a right side of the sealing groove, the second step limits a right side of the oil seal, and a bearing cap is fixedly mounted to a left end face of the shaft mounting bore by a bolt to press an outer ring of the middle bearing to axially limit.

The power assembly, by employing the above structure configuration, has the following advantages:

In the present disclosure, the motor shaft and the input shaft of the gearbox (gearbox) are an integral shaft, and the shaft coupling in the prior art is omitted, which simplifies the structure, improves the structure accuracy, reduces the operation noise, significantly reduces the axial size of the power assembly, and facilitates the light weighing and the arrangement in the vehicle of the power assembly.

In the present disclosure, the parking lock wheel is arranged at the input shaft of the gearbox (gearbox), as influenced by the torque transmission of the gearbox (gearbox), here if the lay-up torque is smaller, the axial size of the parking lock wheel can be designed to be smaller, thereby reducing the axial size of the power assembly, and as the weight of the parking lock wheel is reduced, the weight of the power assembly is accordingly reduced.

The power assembly of the present disclosure reduces the axial size, reduces the manufacturing cost, and has a simple arrangement, a small space occupation, a compact structure and a light weight, which meets the development trend of light weight and electrification.

BRIEF DESCRIPTION OF DRAWINGS

FIG. 1 is a schematic structural diagram of the integrated electric drive power assembly of the first embodiment of the present disclosure.

In the drawings: 1. housing; 2. stator; 3. gearbox front housing; 4. bushing; 5. parking lock wheel; 6. lock nut; 7. gearbox rear housing; 8. left end bearing; 9. first gear; 10. middle shaft; 11. third gear; 12. fourth gear; 13. differential; 14. second gear; 15. middle bearing; 16. oil seal; 17. rotor; 18. main shaft; 19. front end cover; and 20. right end bearing.

DETAILED DESCRIPTION

In order to make the objects, the technical solutions and the advantages of the present disclosure clearer, the embodiments of the present disclosure will be described below in further detail in conjunction with the drawings.

First Embodiment

FIG. 1 shows the first embodiment of the present disclosure. In this embodiment, the integrated electric drive power assembly comprises an motor and a gearbox (usually a gearbox), an output shaft of the motor and an input shaft of the gearbox are integrally manufactured, to form a main shaft 18 of the power assembly, a parking lock wheel 5 is provided within the gearbox, and the parking lock wheel 5 is fixedly mounted to the main shaft, that is, mounted to the main shaft 18.

As influenced by the torque transmission of the gearbox (gearbox), if the lay-up torque on the main shaft is smaller, the axial size of the parking lock wheel 5 can be designed to be smaller, thereby reducing the axial size of the power assembly, and as the weight of the parking lock wheel 5 is reduced, the weight of the power assembly is accordingly reduced.

The motor may be a permanent magnet motor or an excitation motor, and comprises a rotor 17 and a stator 2. The rotor 17 comprises a rotation shaft, and the rotation shaft is a portion of the main shaft 18. The motor further comprises a housing 1, a rear end cover is provided at the left side of the housing 1, and a front end cover 19 is provided at the right side. The other configurations of the motor can be seen in the prior art, and are not described in further detail here.

In order to simplify the structure, a motor rear end cover and a front gearbox body 3 of the gearbox are integrally manufactured, a shaft mounting bore is provided at gearbox front housing 3, and the main shaft 18 passes through the shaft mounting bore to enter the gearbox. Such a design can also effectively reduce the axial size of the power assembly, and simplify the structure of the power assembly.

The housing 1 of the motor and gearbox front housing 3 may be connected and joined by a flange or bolt, and a necessary sealing structure is provided at the connection.

An middle bearing 15 and an oil seal 16 are mounted at the shaft mounting bore, the middle bearing 15 supports the main shaft 18, and the oil seal 16 seals the gap between the main shaft 18 and the shaft mounting bore, to seal and isolate the gearbox and the motor, to prevent the lubricating oil within the gearbox from entering the motor.

A left end bearing 8 and a right end bearing 20 are provided at the two ends of the main shaft 18 respectively, the left end bearing 8 is fixedly mounted to a gearbox rear housing 7 of the gearbox, a bearing seat is correspondingly provided at the gearbox rear housing 7, the right end bearing 20 is fixedly mounted to the front end cover 19 of the motor, and a bearing seat is correspondingly provided at the front end cover 19.

In the prior art the first gear that is connected to the input shaft of a gearbox is usually far from the motor end, and the gear pairs require a larger bearing for supporting (the bearing supports the transmission shaft that passes through the gear), to result in a larger weight. This embodiment particularly improves the structure.

Multi-stage gear pairs are provided in the gearbox, a rightmost first-stage gear pair is connected to the main shaft 18 and is neighboring the motor, and the parking lock wheel 5 is located on a left side of the first gear pair. The first gear pair is the gear pair in the gearbox that is closest to the motor.

Particularly, as shown in FIG. 1, an middle shaft 10 is provided in the gearbox, the axes of the middle shaft 10 and of the main shaft 18 are parallel, the first gear pair comprises a first gear 9 and a second gear 14 that are in engaged transmission, the first gear 9 is connected to the main shaft 18 by a spline, the second gear 14 is connected to the middle shaft 10 by a spline, the right end face of the hub of the first gear 9 presses the inner ring of the middle bearing 15, and a bushing 4 is provided in a bore of a left end to be in interference fit with the main shaft 18 to fix the first gear 9, to radially position the first gear 9.

The parking lock wheel 5 is connected to the main shaft 18 by a spline, the right end face of the hub of the parking lock wheel 5 presses the bushing 4, and the left end face is pressed by the inner ring of the left end bearing 8.

A lock nut 6 is provided at the left end of the main shaft 18 to press the inner ring of the left end bearing 8.

At the position of the connection between the first gear 9 and the main shaft 18, the main shaft 18 is provided with an external spline, and the first gear 9 is provided with an internal spline.

At the position of the connection between the second gear 14 and the middle shaft 10, the main shaft 18 is provided with an external spline, and the second gear 14 is provided with an internal spline.

At the position of the connection between the parking lock wheel 5 and the main shaft 18, the main shaft 18 is provided with an external spline, and the parking lock wheel 5 is provided with an internal spline.

In this embodiment, two stages of transmission gear pairs are provided in the gearbox, a rightmost first-stage gear pair is adjacent to the motor, a second-stage gear pair is located on a left side of the first gear pair, the second-stage gear pair comprises a third gear 11 and a fourth gear 12 that are in engaged transmission, the third gear 11 may be connected to the middle shaft 10 by a spline, the fourth gear 12 is fixedly mounted to a differential 13, and the differential 13 is connected to a vehicle axle (not shown).

At the position of the connection between the third gear 11 and the middle shaft 10, the middle shaft 10 is provided with an external spline, and the third gear 11 is provided with an internal spline.

As shown in FIG. 1, two ends of the middle shaft 10 are each provided with a bearing, and gearbox front housing 3 and the gearbox rear housing 7 of the gearbox are each correspondingly provided with a bearing seat.

Gearbox front housing 3 of the gearbox is provided with a bearing seat and a sealing groove at the shaft mounting bore, the sealing groove is located on a right side of the bearing seat, the middle bearing 15 is mounted in the bearing seat, the oil seal 16 is mounted in the sealing groove, a first step is provided between the bearing seat and the sealing groove, the first step limits the right side of the middle bearing 15, a second step is provided at a right side of the sealing groove, the second step limits the right side of the oil seal 16, and a bearing cap is fixedly mounted to a left end face of the shaft mounting bore by a bolt to press the outer ring of the middle bearing 15 to axially limit.

In an embodiment of the present disclosure, the motor shaft and the input shaft of the gearbox are an integral shaft, and the motor rear end cover and gearbox front housing of the gearbox are integral, which simplifies the structure, and improves the structure accuracy.

The input shaft has merely 3 supports from the motor to the gearbox, which reduces one bearing from the 4 supports in the prior art. Therefore, the present disclosure reduces the overall axial size of the power assembly, and facilitates the layout of the entire vehicle, to result in a compact structure and a light weight.

The parking lock wheel is arranged at the input shaft of the gearbox, which reduces the axial size and the weight of the parking lock wheel.

The first gear pair in the gearbox is adjacent to the motor, and the supporting bearing is omitted, which simplifies the structure, and reduces the weight.

Second Embodiment

This embodiment is an improvement made on the basis of the first embodiment. In the second embodiment of the present disclosure, the third gear 11 and the middle shaft 10 are integrally manufactured, which design can further simplify the structure of the power assembly.

The other structures of the integrated electric drive power assembly of the second embodiment of the present disclosure are the same as those of the first embodiment, and are not repeatedly described here.

The description above is merely particular embodiments of the present disclosure. By the foregoing teachings of the present disclosure, a person skilled in the art may make other improvements or modifications based on the foregoing embodiments. A person skilled in the art should understand that, the particular description above is merely for better interpreting the present disclosure, and the protection scope of the present disclosure should be subject to the protection scope of the claims.

What is claimed is:

1. An integrated electric drive power assembly, wherein the integrated electric drive power assembly comprises a motor and a gearbox, an output shaft of the motor and an input shaft of the gearbox are integrally manufactured, to form a main shaft of the power assembly, a parking lock wheel is provided within the gearbox, and the parking lock wheel is fixedly mounted to the main shaft, wherein a motor rear end cover and a gearbox front housing are integrally manufactured, a shaft mounting bore is provided at the gearbox front housing, and the main shaft passes through the shaft mounting bore to enter the gearbox, a middle bearing and an oil seal are mounted at the shaft mounting bore, the middle bearing supports the main shaft, and the oil seal seals a gap between the main shaft and the shaft mounting bore, to seal and isolate the gearbox and the motor, a left end bearing and a right end bearing are respectively provided at two ends of the main shaft, the left end bearing is fixedly mounted to a gearbox rear housing, a bearing seat is correspondingly provided at the gearbox rear housing, the right end bearing is fixedly mounted to a motor front end cover, and a bearing seat is correspondingly provided at the front end cover, multi-stage gear pairs are provided in the gearbox, a rightmost first-stage gear pair is connected to the main shaft and is neighboring the motor, and the parking lock wheel is located on a left side of the first gear pair, a middle shaft is provided in the gearbox, the first gear pair comprises a first gear and a second gear that are in engaged transmission, the first gear is connected to the main shaft by a spline, the second gear is connected to the middle shaft by a spline, a right end face of a hub of the first gear presses an inner ring of the middle bearing, and a bushing is provided in a bore of a left end face of the first gear to be in interference fit with the main shaft to fix the first gear.

2. The integrated electric drive power assembly according to claim 1, wherein the parking lock wheel is connected to the main shaft by a spline, the right end face of the hub of the parking lock wheel presses the bushing, and a left end face is pressed by an inner ring of the left end bearing.

3. The integrated electric drive power assembly according to claim 2, wherein a lock nut is provided at a left end of the main shaft to press the inner ring of the left end bearing.

4. The integrated electric drive power assembly according to claim 1, wherein two stages of transmission gear pairs are provided in the gearbox, the rightmost first-stage gear pair is adjacent to the motor, a second-stage gear pair is located on a left side of the first gear pair, the second-stage gear pair comprises a third gear and a fourth gear that are in engaged transmission, the third gear and the middle shaft are integrally manufactured, the fourth gear is fixedly mounted to a differential, and the differential is connected to a vehicle axle.

5. The integrated electric drive power assembly according to claim 4, wherein two ends of the middle shaft are each provided with a bearing, and the gearbox front housing and the gearbox rear housing are each correspondingly provided with a bearing seat; and the gearbox front housing is provided with a bearing seat and a sealing groove at the shaft mounting bore, the sealing groove is located on a right side of the bearing seat, the middle bearing is mounted in the bearing seat, the oil seal is mounted in the sealing groove, a first step is provided between the bearing seat and the sealing groove, the first step limits a right side of the middle bearing, a second step is provided at a right side of the sealing groove, the second step limits a right side of the oil seal, and a bearing cap is fixedly mounted to a left end face of the shaft mounting bore by a bolt to press an outer ring of the middle bearing to axially limit.

* * * * *